United States Patent
Guo

(10) Patent No.: US 7,583,882 B2
(45) Date of Patent: Sep. 1, 2009

(54) WAVEGUIDES FOR ULTRA-LONG RANGE SURFACE PLASMON-POLARITON PROPAGATION

(75) Inventor: Junpeng Guo, Madison, AL (US)

(73) Assignee: University of Alabama in Huntsville, Huntsville, AL (US)

( * ) Notice: Subject to any disclaimer, the term of this patent is extended or adjusted under 35 U.S.C. 154(b) by 60 days.

(21) Appl. No.: 11/850,486

(22) Filed: Sep. 5, 2007

(65) Prior Publication Data

US 2008/0112713 A1    May 15, 2008

Related U.S. Application Data

(60) Provisional application No. 60/865,316, filed on Nov. 10, 2006.

(51) Int. Cl.
     *G02B 6/10*      (2006.01)
     *G02F 1/35*      (2006.01)

(52) U.S. Cl. .................. 385/131; 385/129; 385/130; 385/132; 385/39; 359/332

(58) Field of Classification Search ......... 385/129–132, 385/39; 359/332
See application file for complete search history.

(56) References Cited

U.S. PATENT DOCUMENTS

| | | | |
|---|---|---|---|
| 5,011,250 A | 4/1991 | Okada et al. | |
| 5,073,725 A | 12/1991 | Takano et al. | |
| 5,606,633 A | 2/1997 | Groger et al. | |
| 5,835,645 A | 11/1998 | Jorgenson et al. | |
| 5,991,488 A * | 11/1999 | Salamon et al. | 385/129 |
| 6,034,809 A | 3/2000 | Anemogiannis | |
| 6,282,005 B1 * | 8/2001 | Thompson et al. | 398/143 |
| 6,501,783 B1 | 12/2002 | Capasso et al. | |
| 6,587,252 B1 | 7/2003 | Bottrell et al. | |
| 6,614,960 B2 * | 9/2003 | Berini | 385/39 |
| 6,870,237 B1 | 3/2005 | Lin et al. | |
| 6,914,999 B2 * | 7/2005 | Breukelaar et al. | 385/20 |
| 6,998,649 B2 * | 2/2006 | Hata | 257/99 |

(Continued)

OTHER PUBLICATIONS

Durfee, et al., "2007 APS March Meeting", Mar. 5-9, 2007, http://meetings.aps.org/Meeting/MAR07/Event/62643.

*Primary Examiner*—Frank G Font
*Assistant Examiner*—Guy G Anderson
(74) *Attorney, Agent, or Firm*—Lanier Ford Shaver & Payne, P.C.

(57) ABSTRACT

The disclosure relates to surface plasmon-polariton waveguides, which can guide ultra-long range surface plasmon-polariton waves. The attenuation of an ultra-long range surface plasmon-polariton waves is much lower than the attenuation of the conventional long range surface plasmon-polariton waves guided with the same kind of metal film or metal strip at the same plasmon-polariton frequency. An exemplary ultra-long range surface plasmon-polariton waveguide disclosed in this disclosure comprises a metal layer, such as a metal film or finite width metal strip, intermediate dielectric layers adjacent to the metal layer, and outer cladding dielectric material. The intermediate dielectric layers redistribute the electromagnetic energy distribution of the surface plasmon-polariton waves so that less of the energy propagates in the metal layer. Therefore, the attenuation of the surface plasmon-polariton wave is reduced. The propagation distance of the ultra-long range surface plasmon-polariton wave can be designed to a desired value by adjusting the thickness and the material property of the intermediate dielectric layers and other parameters related to the waveguide.

18 Claims, 13 Drawing Sheets

U.S. PATENT DOCUMENTS

| | | |
|---|---|---|
| 7,027,689 B2 | 4/2006 | Blumberg et al. |
| 7,039,277 B2 | 5/2006 | Blumberg et al. |
| 7,039,315 B2 | 5/2006 | Blumberg et al. |
| 7,043,134 B2 | 5/2006 | Berini et al. |
| 2005/0018949 A1 | 1/2005 | Yan |
| 2005/0058425 A1 | 3/2005 | Berini et al. |
| 2005/0063644 A1 | 3/2005 | Park et al. |
| 2005/0238286 A1 | 10/2005 | Lawandy |
| 2005/0238288 A1 | 10/2005 | Crutchfield |
| 2005/0265652 A1 | 12/2005 | Blumberg et al. |
| 2006/0138360 A1 | 6/2006 | Martin |
| 2006/0170925 A1 | 8/2006 | Lin et al. |
| 2006/0170927 A1 | 8/2006 | Wang et al. |
| 2006/0215165 A1 | 9/2006 | Melman |
| 2006/0238767 A1 | 10/2006 | Chen et al. |
| 2007/0146866 A1* | 6/2007 | Wright .................. 359/332 |
| 2008/0056660 A1* | 3/2008 | Lee et al. .............. 385/131 |

* cited by examiner

WAVEGUIDES FOR ULTRA-LONG RANGE SURFACE PLASMON-POLARITON PROPAGATION

CROSS REFERENCE TO RELATED APPLICATION

This document claims priority to U.S. Provisional Application No. 60/865,316 entitled "Systems and Methods Using Ultra-Long Range Surface Plasmon Waves in Finite Width Metal Strips," and filed on Nov. 10, 2006, which is incorporated herein by reference.

RELATED ART

Surface plasmons are free electron density oscillations on the surface of metals in dielectric media. The propagation of a surface plasmon couples with an electromagnetic wave along the boundary. The coupled state between the surface plasmon and the surface electromagnetic wave is referred as the surface plasmon-polariton (SPP). The electromagnetic field of the electromagnetic wave is a transverse magnetic (TM) field located near the surface of the metal. The condition for supporting a surface plasmon-polariton wave is that the two materials must have dielectric constants of opposite signs, such as, for example, a metal and a dielectric material. For example, when a boundary is formed between a metal, such as gold, having a dielectric constant with a negative real part, and a dielectric material, such as silicon dioxide, having a positive dielectric constant, a surface plasmon-polariton wave can propagate if it is excited. Surface plasmon-polariton waves attenuate rapidly in the propagation due primarily to the intrinsic free electron oscillation damping loss in the metal. The travel range of surface plasmon-polariton waves along surfaces of metals, defined as 1/e of the initial power intensity, is typically in the range between several tens micron to several hundreds micron in the optical frequency.

A surface plasmon-polariton wave can be generated when energy from an excitation source, such as a laser, radiate the metal near the boundary between the metal and the dielectric material. The radiation energy produces free electron oscillation at the frequency of the excitation source, in portions of the metal adjacent to the boundary. Such free electron density oscillation induces an electromagnetic wave that propagates along the boundary in both the metal and dielectric material. As will be described in more detail below, the surface plasmon-polariton waves attenuate dramatically as they propagate. The amount of attenuation determines the propagation range, wherein the greater the attenuation, the shorter the propagation range.

Metals are intrinsic lossy media for electromagnetic waves due primarily to the free electron collision energy loss. Thus, surface plasmon-polariton (SPP) waves attenuate rapidly in the propagation due primarily to the intrinsic free electron collision loss during the oscillation in the metal. The attenuation is related to the imaginary part of the metal electric permittivity as well as the SPP waveguide structure. Although metal, as described above, is one kind of the materials used for propagating SPP waves, other synthesized materials having electric permittivity with a negative real part can also be substituted for a metal.

SPP waves and structures that support their propagation can be analyzed using any of several known semi-analytical and numerical methods. Such methods are capable of determining the supported modes of propagation and the propagation range of such supported modes for a defined a plasmon-polariton waveguide structure. Known tools for analysis and evaluation of SPP propagation in waveguides include semi-analytical and numerical methods such as reflection-pole method (RPM), finite element (FE) and finite difference (FD) methods. Since surface plasmon-polariton waves are electromagnetic waves, the above tools are beneficial for analyzing such waves. In addition, the methods of lines (MOL) and the film mode matching (FMM) techniques are also used for analysis of plasmon-polariton waves in given structures. Commercial software packages, such as FIMMWAVE™ from Photon Design Ltd. of Oxford, United Kingdom, are available for solving plasmon-polariton waveguide modes. Such tools, numerical techniques and software packages, provide techniques for analyzing the propagation properties and modes of any structure that functions as a waveguide for surface plasmon-polariton waves.

In the past, several methods have been tried to extend the travel range of surface plasmon-polariton waves. One method is to use thin metal films and finite width metal strips.

For a thin metal film in homogeneous dielectric media, when the thickness of the metal film is smaller than the surface plasmon penetration depth in the bulky metal, the two surface plasmon-polariton waves are generated on two surfaces of the metal film, and these SPP waves couple together and form two fundamental plasmon-polariton wave modes.

The first mode has the symmetric magnetic field mode profile with respect to the center of the metal film. The second mode has the anti-symmetric magnetic field mode profile with respect to the center of the metal film. The travel range of the symmetric plasmon-polariton mode is longer than the travel range of the plasmon-polariton mode along a single surface of the bulk metal. It is therefore also called the long range surface plasmon-polariton mode. The travel range of the anti-symmetric surface plasmon-polariton mode is shorter than the travel range of the surface plasmon-polariton mode along a single surface of the bulk metal. As the thickness of the metal film decreases, the travel range of the symmetric surface plasmon-polariton mode increases and the travel range of the anti-symmetric surface plasmon-polariton mode decreases. Reducing the thickness of metal films to less than 15 nm is problematic because it is experimentally difficult to deposit homogeneous metal films having a thickness of about 15 nm or less since metals typically form nanoscale islands in the initial deposition process. In addition, many metal films lose their metallic property when the thickness of metal films approaches to the atomic scale Because it is often desirable to propagate plasmons over long distances, long range surface plasmon-polariton waves are often the subject of plasmon research. A conventional waveguide typically comprises a thin metal film or a finite width thin metal strip embedded in a homogeneous dielectric medium as the cladding. Such conventional structures can serve as waveguides for the propagation of surface plasmon-polariton waves. However, the LRSP modes supported by the conventional waveguides usually provide a travel range in the order of millimeters. The propagation range provided by the conventional structure is not as great as desired for many applications.

Hence, it is desirable to have a SPP waveguide that provides greater propagation ranges than are available when using conventional structures.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
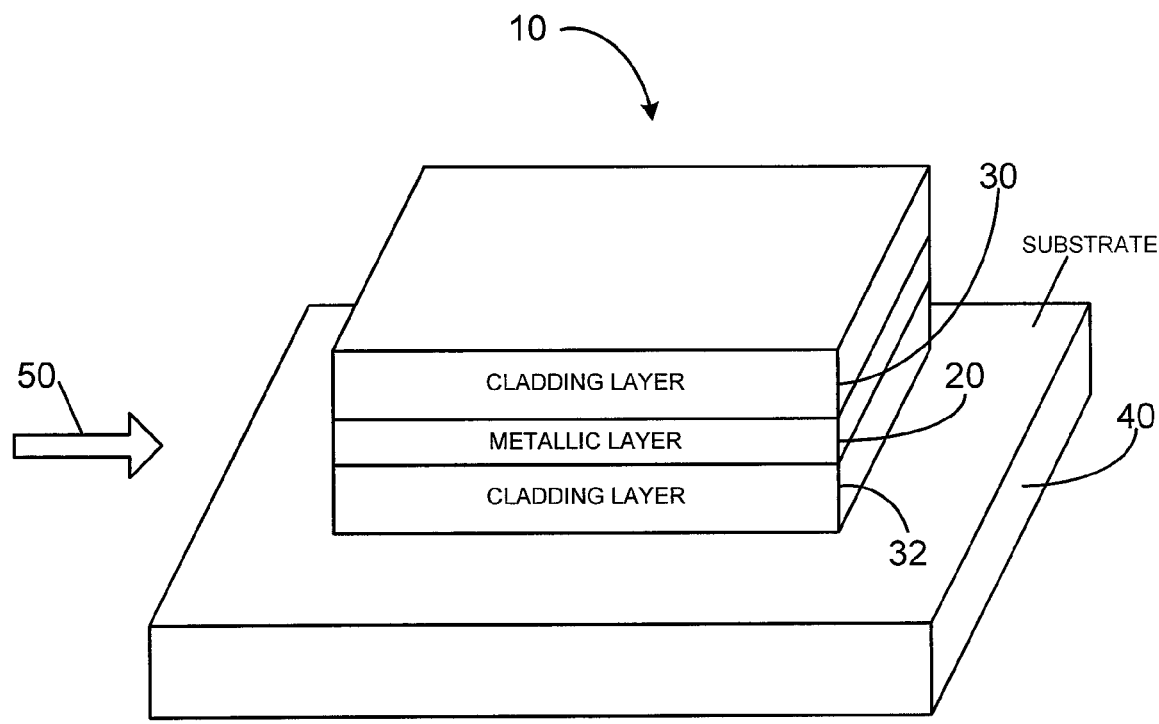
FIG. 1 depicts a conventional waveguide for propagating a surface plasmon-polariton wave. The conventional waveguide comprises a thin metal film or a finite width thin metal strip embedded in a homogeneous dielectric material as the cladding.

A conventional waveguide 10 for propagating a surface plasmon-polariton wave is depicted in FIG. 1. The conventional waveguide 10 guides a surface plasmon-polariton (SPP) wave in the z direction as shown. The long range surface plasmon-polariton mode of the conventional waveguide 10 has a propagation range of a few millimeters or less for surface plasmon-polariton waves that are induced by an excitation signal 50, such as a laser, at optical frequencies.

The conventional waveguide 10 comprises layers of material deposited on a substrate 40. The substrate 40 serves as a support structure for the other layers. A first homogeneous dielectric material is deposited on the substrate 40 and is referred to as a bottom homogeneous dielectric cladding layer 32. A metallic layer 20 is then deposited on the top surface of the bottom homogeneous dielectric layer 32. Another layer 30 of homogeneous dielectric material, referred to as the top homogeneous dielectric cladding layer 30, is then deposited on the top surface of the metallic layer 20 as depicted in FIG. 1. The thickness of the material of each layer is measured in the x direction, which is perpendicular to the z direction, and the width of the material of each layer is measured in the y direction, which is perpendicular to the x direction and the z direction.

The length of each layer is measured in the z direction, which is the direction of propagation. The metallic layer 20 typically has a thickness of several ten nanometers (nm). The cladding layers 30, 32 typically have a thickness much greater than the metallic layer 20 in the order of tens to hundreds microns. The length of layers 20, 30, 32 is generally the same and dependent on the desired use of conventional waveguide 10. The propagation range of a SPP wave is the distance traveled from the origin by the surface plasmon-polariton wave to a point where the attenuation from the origin reaches 1/e. A SPP wave propagating along the waveguide 10 usually has a propagation range in the order of millimeters or less. Such propagation ranges are useful for some plasmon transport applications but are often too short for other applications.

The metallic layer 20 can be fabricated according to known thin film fabrication techniques and can be referred to as a thin metal film when fabricated according to such techniques. When the width of the metallic layer 20 is limited, such as a few microns or less, the layer 20 is sometimes referred to as a finite width metal strip. Reducing the width of the metallic layer 20 generally helps to increase propagation range by reducing the amount of metallic material through which the SPP wave must travel. If desired, dielectric material (not shown) may be added to the sides so that the metal strip is surrounded by cladding material.

Figure 2:
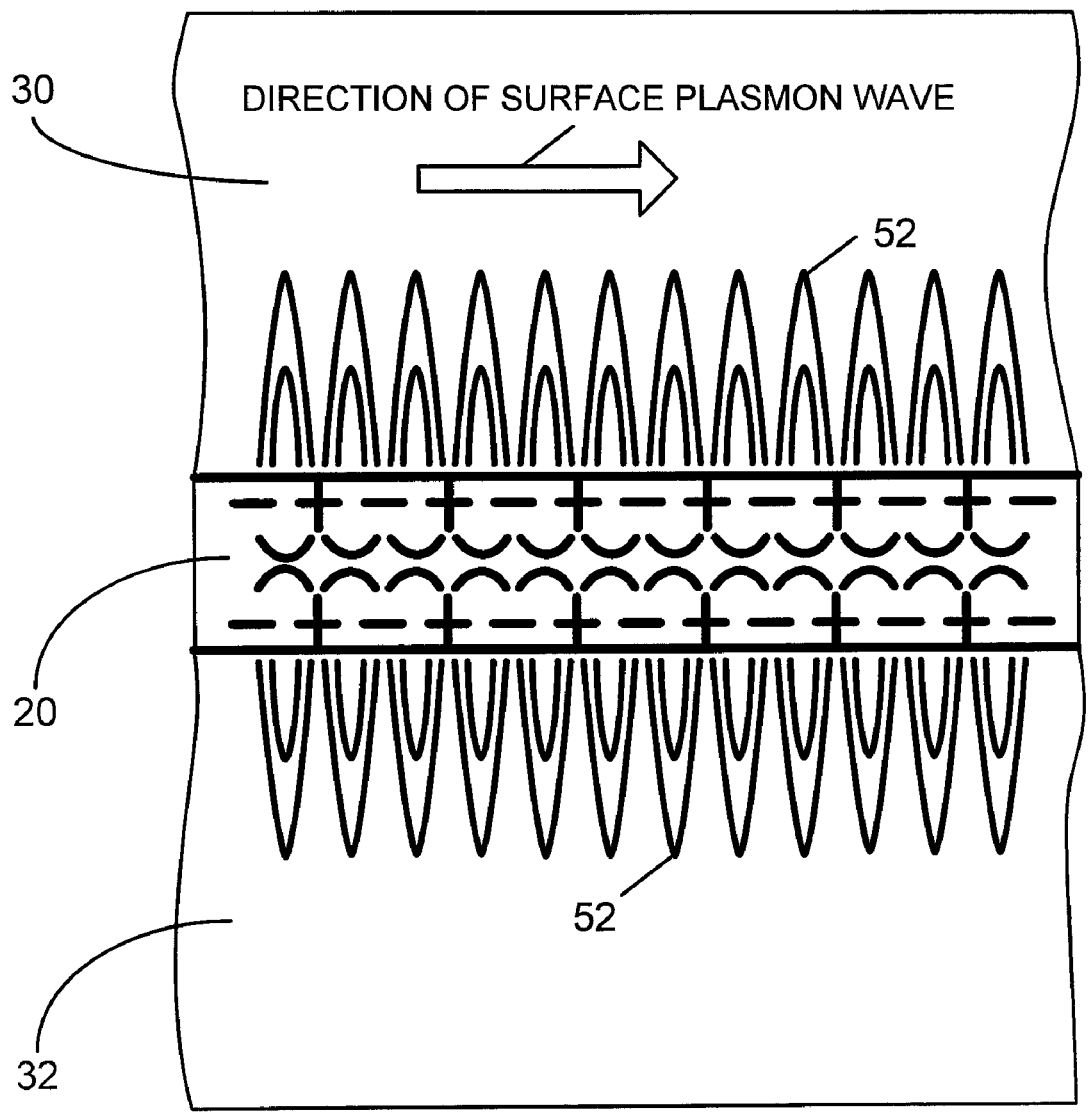
FIG. 2 depicts a surface plasmon-polariton wave propagating through the conventional waveguide of FIG. 1.

FIG. 2 depicts an exemplary propagation of a surface plasmon-polariton wave along the metallic layer 20. To generate the surface plasmon-polariton wave, which is represented by repeating symbols 52 in FIG. 2, a light source excites electrons in the metallic layer 20 causing the electrons to oscillate. When the thickness of the layer 20 is sufficiently small, electrons at both the top and bottom surface of the metallic layer 20 oscillate generating a SPP wave that propagates along the top surface and a SPP wave that propagates along the bottom surface. Note that that the positive and negative signs in FIG. 2 represent the electron oscillations occurring in the metallic layer 20. For a bulk metallic layer 20 having a relatively large thickness, it is possible for electrons on only one surface to oscillate. The oscillating electrons induce an electromagnetic field. The electromagnetic field varies with time based on the electron oscillations, and electromagnetic energy, which can be sensed via a photon detector, propagates along the boundary between the metallic layer 20 and the dielectric material. While a SPP wave is propagating, electromagnetic energy flows through both the metallic material and the dielectric material. When the thickness of the metal layer 20 is less than the penetration depth of the SPP waves propagating along the top and bottom surfaces of the metal layer 20, the SPP waves couple together forming a coupled SPP wave 52 that has an increased propagation range.

To transmit data, a light signal, such as a laser, can be modulated with data and directed toward the metallic layer 20. As an example, the laser can be butt-coupled with the metallic layer 20. Upon striking the metallic layer 20, the light signal generates a surface plasmon-polariton waye that propagates through the metallic layer 20 and dielectric material. A photon detector (not shown) can detect the photons of the electromagnetic wave induced by the oscillating electrons and measure the photon intensity, which varies with time. The originally transmitted data can then be recovered from the measured intensity values.

Unfortunately, the surface plasmon-polariton wave is significantly attenuated by the metallic layer 20, and the propagation range of the surface plasmon-polariton wave is limited. Due to the propagation range limitations, the use of surface plasmon-polariton waves to transmit data has not been widely adopted.

Figure 3:
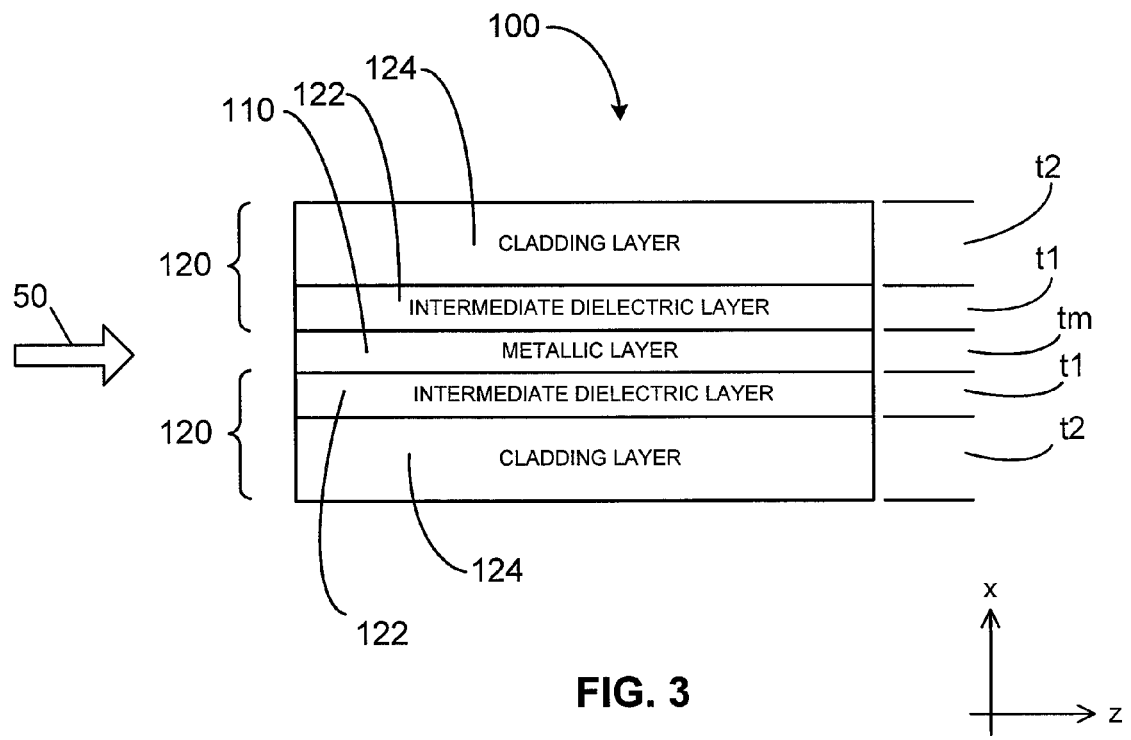
FIG. 3 depicts an exemplary embodiment of a SPP waveguide for propagating a surface plasmon-polariton wave in accordance with the present disclosure.

An exemplary embodiment of a waveguide 100 is depicted in FIG. 3. As will be seen, the propagation range for a surface plasmon-polariton wave propagating through waveguide 100 is several orders of magnitude greater than for waves propagating through conventional structures, such as conventional waveguide 10.

Similar to the conventional waveguide 10, the waveguide 100 of FIG. 3 has a layer 110 sandwiched between cladding material. In this regard, waveguide 100 comprises cladding layers 124 formed above and below the layer 110, respectively. The cladding layers 124 are composed of a dielectric material. In one embodiment, the layer 110 is composed of a metal, such as gold, and is referred to as a "metallic layer." However, the layer 110 may be composed of other types of material in other embodiments. It is sufficient for the layer 110 to be composed of any material having a dielectric constant opposite in sign relative to the cladding layers 124 so that SPP wave propagation is supported.

Note that the layers 110, 122, 124 may be formed on a substrate, similar to the waveguide 10 shown by FIG. 1. For simplicity such a substrate is not shown. It is to be understood, however, that any of the waveguide embodiments described herein may be formed on a substrate in order to provide the waveguide with greater mechanical support.

Unlike the conventional waveguide of FIG. 1, the waveguide 100 comprises a respective intermediate dielectric layer 122 formed between the metallic layer 110 and each cladding layer 124. The intermediate dielectric layers 122 are composed of a material having a dielectric constant below the dielectric constant of the cladding layers 124. In at least one embodiment, the intermediate dielectric layers 122 are symmetric about the metallic layer 110 in that they are composed of the same material and have the same thickness. However, asymmetric arrangements of the dielectric layers 122 are also possible.

Thus, a core of the waveguide 100 comprises a core of metallic material that is sandwiched between dielectric materials. Further, the core is sandwiched between cladding material having a dielectric constant that is higher than that of the dielectric material in the core.

As a SPP wave is propagating along the metallic layer 110, electromagnetic energy flows through the metallic layer 110, the intermediate dielectric layers 122, and the cladding layers 124. However, as will be described in more detail below, the lower dielectric constant of the intermediate dielectric layers 122 relative to that of the cladding material allows the electromagnetic energy of a propagating SPP wave to be more distributed through the dielectric material and, therefore, less concentrated in the metallic layer 110, which is lossy relative to electromagnetic energy. Thus, the SPP wave experiences less overall attenuation from the metallic layer 110, and the propagation range of the SPP wave is significantly increased relative to a waveguide, such as the one depicted in FIG. 1, which does not have an intermediate dielectric layer between the cladding material and the metallic layer 110.

For one exemplary embodiment, the metallic layer 110 has a thickness, t, measured in the x direction, of around 20 nm and a width, measured in the y direction. For other embodiments, the thickness of the metallic layer 110 can have other values. In addition, as described further herein, it is desirable for the thickness of the metallic layer 110 to be less than the penetration depth of the SPP wave. It is well known that the penetration depth of a surface plasmon-polariton wave is dependent on the frequency (or wavelength) of the excitation signal 50 and the characteristics of a selected metallic material through which the surface plasmon-polariton wave propagates. For various exemplary embodiments of waveguide 100, the thickness of the metallic layer 110 is in a range between approximately 15 and 100 nm, but other thickness values are possible.

The metallic layer 110 is composed of a material, such as a metal or a semiconductor material, having a dielectric constant with a negative real part. For an exemplary embodiment of the waveguide 100, the material for the metallic layer 110 is gold which has a dielectric constant (expressed as a complex number), $\in_M = -114.925 - 11.0918 j$ for a wavelength of 1.55 microns. For other embodiments, the metallic layer 110 is composed of other metals, such as, for example, silver, copper or aluminum. The layer 110 can be composed of any material having a dielectric constant with a negative real part. For some applications, the metallic layer 110 serves both as an element of waveguide 100 and as an electrical conductor for transporting electrical current between electrical components. When the metallic layer 110 serves such a dual function, the material of the layer 110 preferably has a dielectric constant as described and has a sufficiently low resistivity to provide a good electrical conduction path as may be desired for the given application.

As described herein, each intermediate layer 122 is composed of dielectric material having a dielectric constant with a positive real part that is below the positive real part of the dielectric constant of the cladding material. For an exemplary embodiment, the intermediate dielectric layer 122 contacting the top surface of the metallic layer 110 is essentially identical to the intermediate layer 122 contacting the bottom surface of the metallic layer 110. For an exemplary embodiment, both intermediate dielectric layers 122 are composed of silicon dioxide which has a dielectric constant, $\in_I$, of about 2.1, and the width of each intermediate dielectric strip 122 is about the same as the width of the metallic layer 110. The thickness of each of the intermediate dielectric layer strips 122 can be selected in order to provide different propagation characteristics depending on the types of material and the dimensions for the waveguide 100.

A respective cladding layer 124 contacts the outside surface, the surface furthest from the metallic layer 110, of each of the intermediate dielectric layers 122. In one embodiment, the thickness, t2, of each cladding layer 124 is about 100 microns or more, but a thickness less than 100 microns is also possible. In an embodiment of waveguide 100, the material for cladding layers 124 is silicon nitride which has a dielectric constant, $\in_c$, of 4.0. For various embodiments of the present disclosure, the dielectric constant of the cladding layers 124 is greater than the dielectric constant of the intermediate layers 122. In other embodiments, other materials having other dielectric constants and characteristics can be used. In general, the dielectric constant of the intermediate layers ($\mp_I$) is preferably less than the dielectric constant of the cladding layers The combination of an intermediate dielectric layer 122 and a cladding layer 124 forms a heterogeneous dielectric layer 120. The heterogeneous dielectric layer 120 comprises layers of materials having different dielectric constants (two for the depiction in FIG. 3). Hence, there is a heterogeneous dielectric layer 120 contacting the top surface of metallic layer 110 and another heterogeneous dielectric layer 120 contacting the bottom surface of the metallic layer 110. Thus, waveguide 100 comprises a metallic layer 110 sandwiched between heterogeneous dielectric layers 120, where material of the heterogeneous layer 120 close to the metallic strip has a dielectric constant that is smaller than the dielectric constant of the material further from the metallic layer 110. Note that conventional waveguide 10 comprises a metallic layer 20 sandwiched between homogeneous dielectric layers 30, 32.

Figure 4:
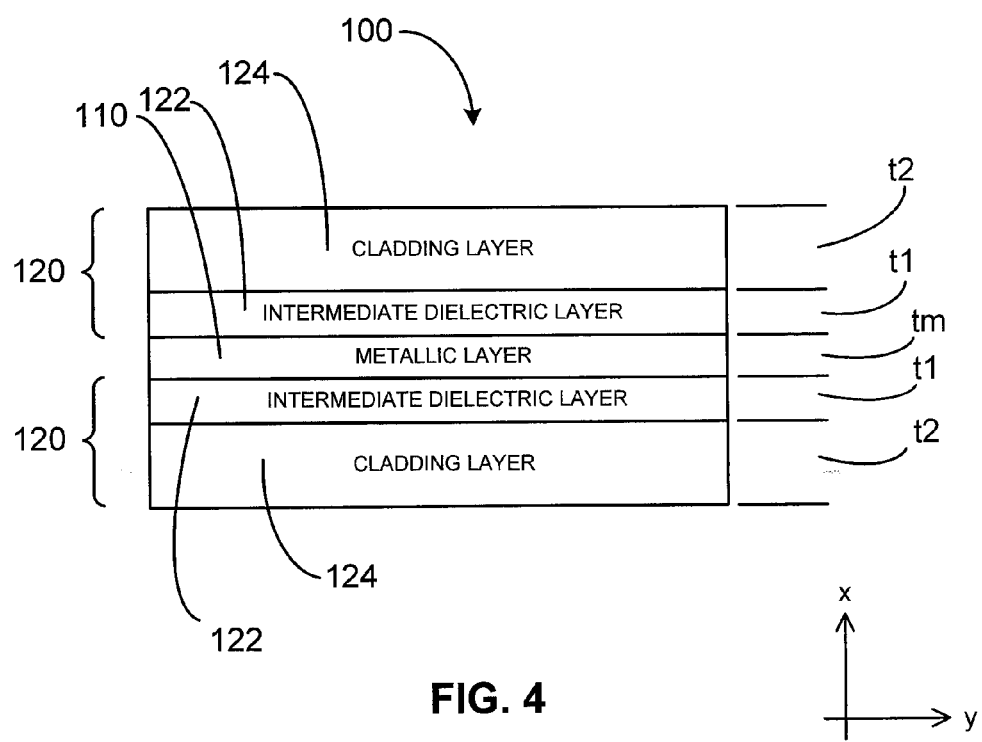
FIG. 4 depicts an end view of the SPP waveguide depicted in FIG. 3 in accordance with the present disclosure.
Figure 5:
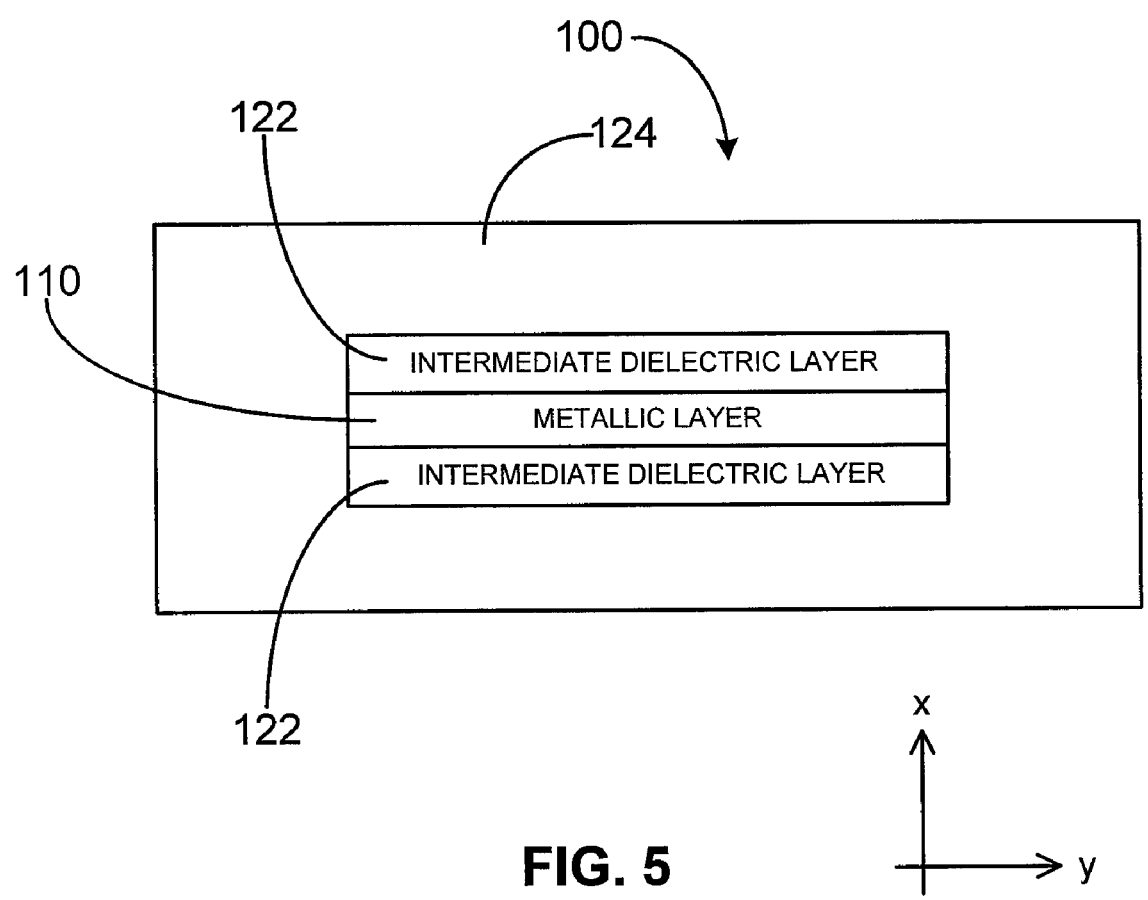
FIG. 5 depicts an end view of an exemplary embodiment of a SPP waveguide for propagating a surface plasmon-polariton wave in accordance with the present disclosure.

FIG. 4 depicts an end view of the waveguide 100 depicted in FIG. 3 for one exemplary embodiment. Similar to the metallic layer 20 of the conventional waveguide 10, the metallic layer 110 can be fabricated according to known thin film fabrication techniques and can be referred to as a thin metal film when fabricated according to such techniques. FIG. 3 and FIG. 4 together depict one exemplary embodiment with wide widths of the metallic layer, the intermediate layers and the cladding layers in the y-direction. When the width of the metallic layer 110 is limited, such as a few microns or less, the layer 110 can be referred to as a finite width metal strip. FIG. 5 illustrates one exemplary embodiment having a finite width metal strip 110 sandwiched between two finite width intermediate dielectric layers 122. Further, a cladding layer 124 surrounds the metallic strip 110 and the intermediate dielectric layers 122. The intermediate dielectric layers 122 are symmetric about the metallic strip 110 and have a dielectric constant below that of the cladding layer 124

Figure 6:
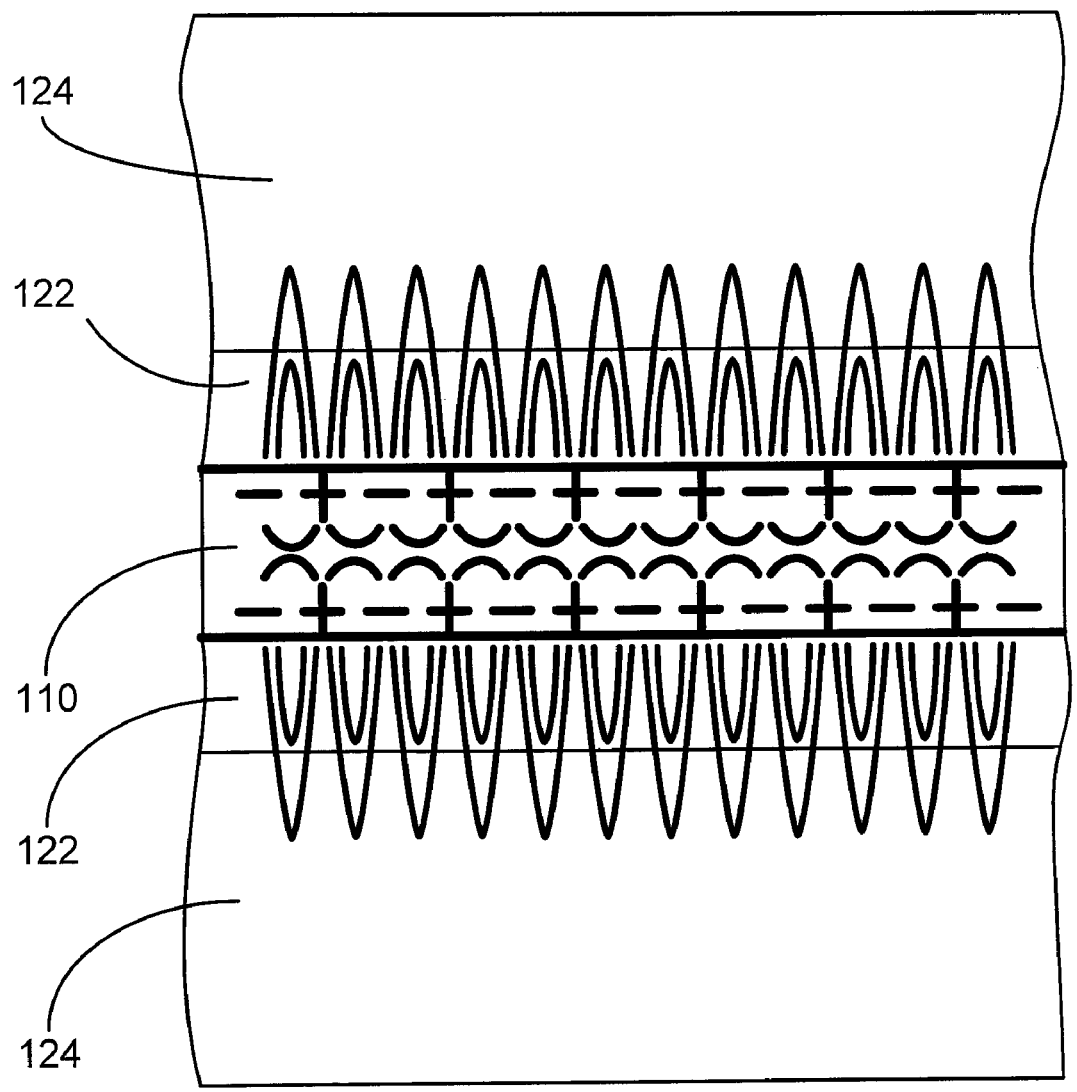
FIG. 6 depicts a surface plasmon-polariton wave propagating through the waveguide of FIG. 3.
Figure 6:
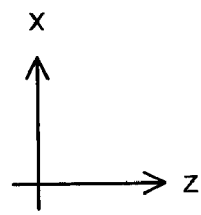

FIG. 6 depicts a propagation of surface plasmon-polariton waves in the waveguide 100. The propagation is similar to that described above for conventional waveguide 10 except that the electromagnetic energy of the SSP wave 52 passes through the material of the intermediate dielectric layers 122 near the surface of the metallic layer 110. The electromagnetic energy also passes through the cladding material having a higher dielectric constant.

Further, the thickness of the metallic layer 110 is sufficiently small such that the top surface plasmon-polariton wave couples with the bottom surface plasmon-polariton wave thereby forming a coupled surface plasmon-polariton wave 52 that propagates through the metallic layer 110 and dielectric layers 122. Having the thickness of the metallic layer 110 less than the penetration depth of the top surface plasmon-polariton wave and the bottom surface plasmon-polariton wave ensures that the two waves, which are coherent and coupled.

Moreover, intermediate dielectric layers redistribute the energy to be more concentrated in the dielectric materials and, therefore, less concentrated in the metallic material, which is lossy with respect to electromagnetic energy. Since the dielectric material attenuates the electromagnetic energy less relative to the metallic material, the propagation range of the coupled surface plasmon-polariton wave is much greater than that achieved in a conventional waveguide. In general, the more that the electromagnetic energy is concentrated in the dielectric materials rather than the metallic material, the greater is the propagation range of the surface plasmon-polariton wave.

In addition, reducing the thickness of the metallic layer 110 generally increases the concentration of the electromagnetic energy in the dielectric materials. Thus, in an effort to maximize propagation range, it is generally desirable to minimize the thickness of the metallic layer 110. However, it is well known that, when the thickness of a metal material approaches about 15 nm or less, the physical characteristics (e.g., conductivity) of the material changes significantly. To prevent such physical changes, it may be desirable to select a thickness greater than about 15 nm. In at least one embodiment, the thickness of the metallic layer 110 is about 20 nm as an optimization between minimizing thickness and ensuring that the material of the layer 110 maintains its bulk physical characteristics. However, another thickness is possible in other embodiments.

Furthermore, the intermediate dielectric material having a lower dielectric constant relative to the cladding is preferably symmetric about the metallic material. Thus, in the embodiments depicted by FIG. 3, the intermediate dielectric layers 122 are composed of the same material and have the same thickness with respect to one another. The symmetric nature of the dielectric material helps the top and bottom surface plasmon-polariton waves to have the same velocity and generally enhances the coupling efficiency of the two waves. Thus, more electromagnetic energy of the surface plasmon-polariton wave is concentrated in the dielectric material thereby extending the propagation range. However, it is possible for the dielectric material to be asymmetric relative to the metallic material of the layer 110 in other embodiments.

In addition, as described above, the dielectric constant of the metallic material is a complex number with a negative real part. The dielectric constants of the dielectric material are positive. Further, the dielectric constant of the dielectric material for the intermediate layers 122 is less than that of the cladding layers 124. Accordingly, more electromagnetic energy is concentrated in the intermediate layers and the dielectric cladding helping to extend propagation range.

In addition, smaller widths of the metallic layer 110 are generally desirable to reduce the amount of metallic material through which the SSP wave passes thereby helping to reduce the wave's attenuation. However, fabrication techniques at the nanoscale level are generally more complex and expensive than at the microscale level. For this reason, the width of the layer 110 in at least one embodiment is on the order of about 1 or 2 microns, but other widths are possible in other embodiments.

Data may be transmitted via the modulation of a SPP wave along a SPP waveguide 100. In this regard, a light signal may be modulated with data and directed toward the metallic layer 110. As an example, a laser (not shown) may be butt-coupled with the metallic layer 110. The light signal generates a surface plasmon-polariton wave propagating in the waveguide. Electron oscillation from the surface plasmon-polariton wave induces an electromagnetic field. A photon detector, or some other type of detection device, is then used to sense the electromagnetic field and, hence, the surface plasmon-polariton wave. In this regard, when a photon detector is used, the photon detector senses a photon intensity of the time varying electromagnetic field, and the measured intensity values can be used to recover the originally transmitted data.

Figure 7:
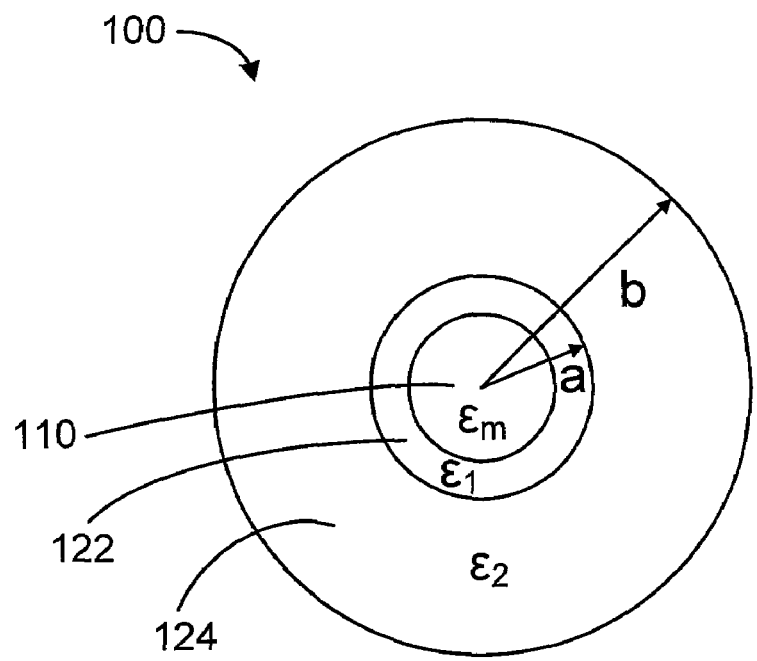
FIG. 7 depicts an end view of an exemplary embodiment of a SPP waveguide for propagating a surface plasmon-polariton wave in accordance with the present disclosure.

An end view of an exemplary embodiment of a circular waveguide 100 in accordance with the present disclosure is depicted in FIG. 7. The circular waveguide 100 comprises a layer 110 having a circular cross-section, and the layer 110 is composed of a material having a dielectric constant with a negative real part. In one embodiment, the layer 110 is composed of a metal, such as gold, and is referred to as a metallic layer. In other embodiments, other types of material are possible. A circular intermediate dielectric layer 122 surrounds the circular metallic layer 110 and is composed of material having a dielectric constant with a positive real part. The circular intermediate dielectric layer 122 is surrounded by a circular cladding layer 124 having a dielectric constant with a real part that is greater than the real part of the dielectric constant of the circular intermediate layer 122. Hence, circular waveguide 100 comprises three concentric layers of materials having different dielectric constants.

The dielectric constants of the waveguide 100 of FIG. 7 increase radially from a negative value (for the real part of the constant) for the metallic layer 110 to a positive intermediate value for the circular intermediate dielectric layer 122 to a larger positive value for the circular cladding layer 124. Thus, the dielectric constant of the intermediate dielectric layer 122 is lower than that of the cladding layer 124, and the intermediate dielectric layer 122 and cladding layer 124, in three dimensions, form hollow concentric cylinders surrounding the metallic layer 110. In contrast, an optical fiber typically comprises two concentric dielectric layers wherein the inner layer (the core) has a dielectric constant that is greater than the dielectric constant of the outer concentric cladding. A manufacturing technique for producing the circular waveguide 100 can be similar to conventional techniques for drawing (pulling a fiber through a circular preform) that is used for producing a strand of optical fiber, as is well known in the art.

Figure 8:
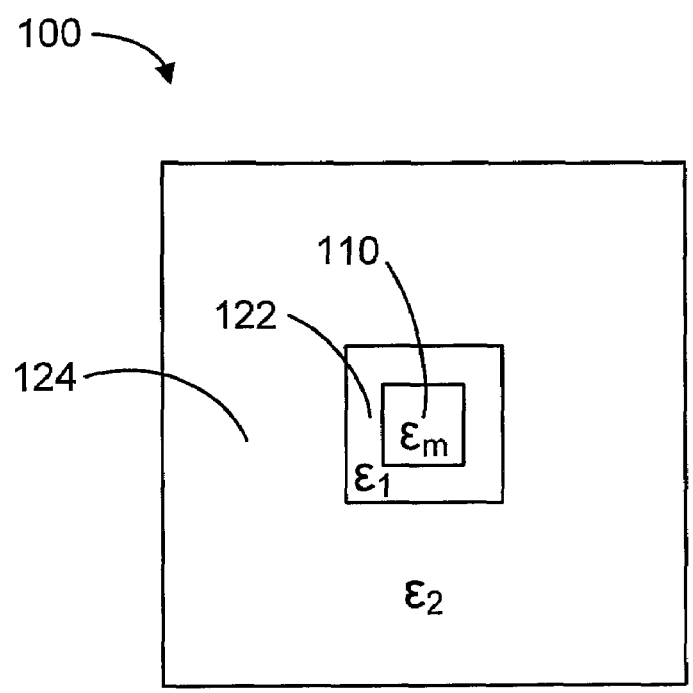
FIG. 8 depicts an end view of an exemplary embodiment of a SPP waveguide for propagating a surface plasmon-polariton wave in accordance with the present disclosure.

An end view of an exemplary embodiment of a square waveguide 100 in accordance with the present disclosure is depicted in FIG. 8. The square waveguide 100 has a square metallic layer 110 composed of material in accordance with that described above for other embodiments. A square intermediate dielectric layer 122 surrounds the square metallic layer 110 and is composed of a material having a dielectric constant in accordance with that described above for other embodiments. The square intermediate dielectric layer 122 is surrounded by a square cladding layer 124 having a dielectric value that is greater than the dielectric constant of the square intermediate layer 122. The square waveguide 100 comprises three square layers of material each having a different dielectric constant. As in the above embodiments, the dielectric constant for the layers increases from a negative value (for the real part of the constant) for the square metallic layer 110 to an intermediate value for the square intermediate dielectric layer 122 to a large value for the dielectric cladding 124. Other shapes and configurations of the layers 110, 122, 124 are possible in other embodiments.

Figure 9:
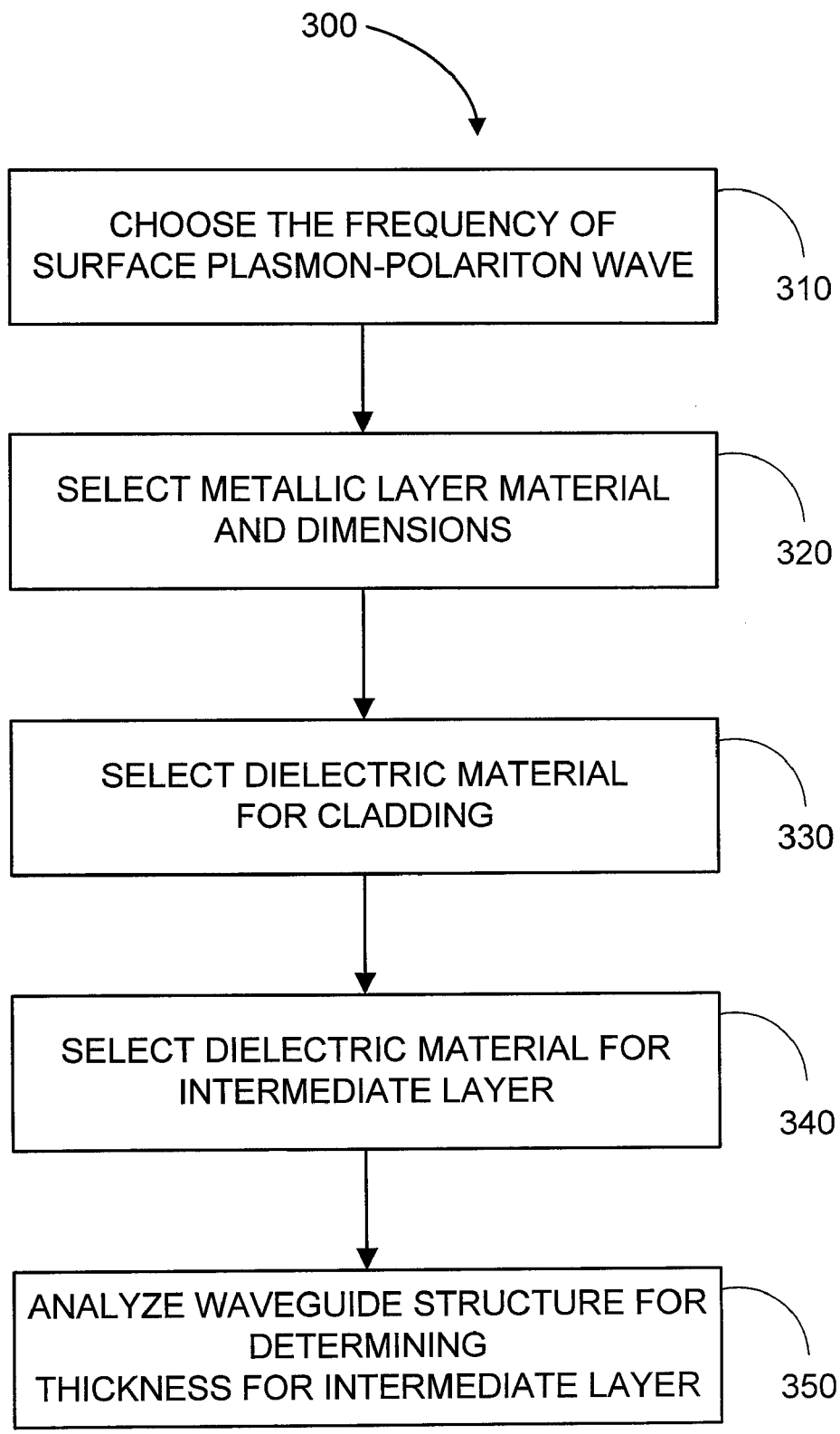
FIG. 9 depicts an exemplary method for designing a waveguide in accordance with an exemplary embodiment of the present disclosure.

Exemplary steps for designing various embodiments of the present disclosure, such as waveguides 100, are depicted in FIG. 9. Because the frequency of the excitation signal is usually selected before waveguide parameters are selected, step 310 is to choose the frequency of the surface plasmon-polariton wave. Note that the SSP wave generated in response to the excitation signal will have the same frequency as the excitation signal. After the frequency is known, a material for the metallic layer 110 is selected, step 320, from a group of metals, such as gold, silver, or copper. The thickness of the metal is chosen to be around 20 nm, but another thickness is possible depending on a desired application. It is generally desirable for the thickness to be sufficiently small so that a surface plasmon-polariton wave on one surface couples with a surface plasmon-polariton wave on another surface... In general, a surface plasmon-polariton wave has a greater range of propagation for a smaller thickness of the metallic layer 110. Thus, it is generally desirable to minimize the thickness of the metallic layer 110. However, as described above, the physical characteristics (e.g., conductivity) of many materials significantly change as the thickness approaches 15 nanometers or less. Therefore, it may be desirable to select a thickness above 15 nm, such as about 20 nm, in an effort to ensure that the physical characteristics of the material used for the metallic layer 110 is similar to the physical characteristics of the same bulk material. However, if a material remains electrically conductive at a thickness of 15 nm or less, thereby allowing electrons to be freed to generate surface plasmon-polariton waves, then such a thickness may be used.

Moreover, dielectric materials are selected for the cladding layer 124 and the intermediate dielectric layer 122, also referred to herein as intermediate layer 122. The materials of the cladding layer 124 and the intermediate layer 122 are selected to be consistent with a selected fabrication process. Parameters for the structure are then analyzed by numerical techniques to determine what plasmon surface wave modes are supported and what is the expected propagation attenuation of the supported mode. If the desired requirements are not satisfied, the steps shown by FIG. 9 may be repeated with different selections.

Figure 10:
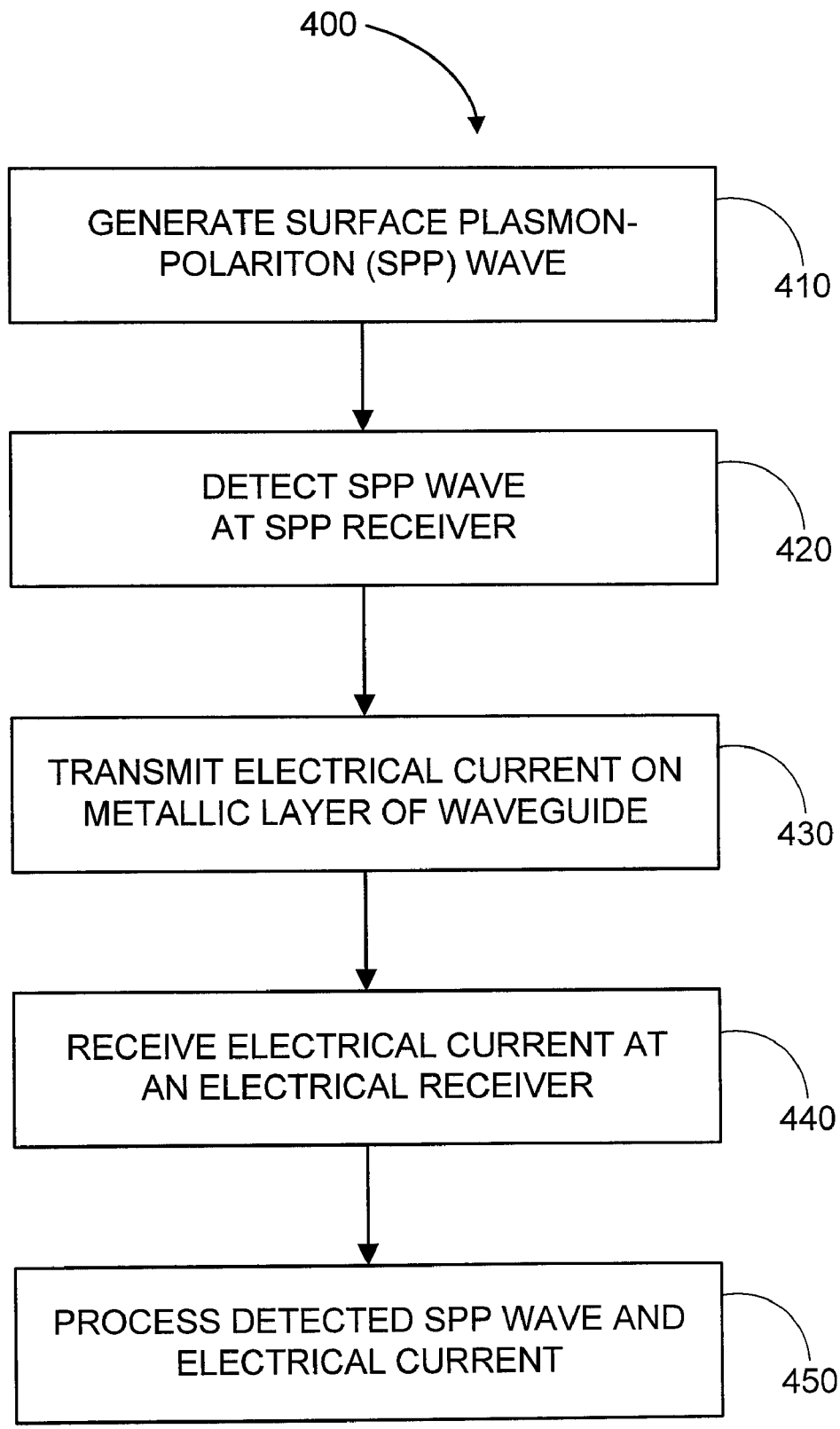
FIG. 10 depicts an exemplary method for communicating information in accordance with the present disclosure.

When a waveguide 100, in accordance with the present disclosure, is capable of supporting and transporting a surface plasmon-polariton wave of a selected frequency in a desired propagation range, then the waveguide 100 can be used to transport information from one location to another. FIG. 10 depicts an exemplary method for transmitting information over a SSP waveguide. In step 410, a surface plasmon-polariton wave is generated at a first location by directing light energy toward the metallic layer 110. As the surface plasmon-polariton wave propagates along waveguide 100, a surface plasmon-polariton (SSP) wave receiver at a second location receives the surface plasmon-polariton wave, step 420. If the metallic layer 110 is also used as a conductor for connecting electrical circuits, then electrical current is transmitted from a transmitter, step 430, and received by a receiver, step 440. In general, the metallic layer 110 provides a conduction path between the transmitter and receiver. The metallic layer 110 combined with layers of dielectric material in accordance with the present disclosure provides a transmission path for a surface plasmon-polariton wave. Note that a surface plasmon-polariton wave and electrical current may be simultaneously, or otherwise, transmitted via the waveguide 100.

To transmit both a SSP wave and an electrical current via the same waveguide 100, the waveguide may be butt-coupled to a light source and a SPP receiver, as described above, as well as an electrical transmitter and an electrical receiver. However, in such an embodiment, reflections may be undesirably introduced at junctions in the waveguide (e.g., where a waveguide portion carrying the SSP wave meets a waveguide portion carrying electrical current).

Figure 11:
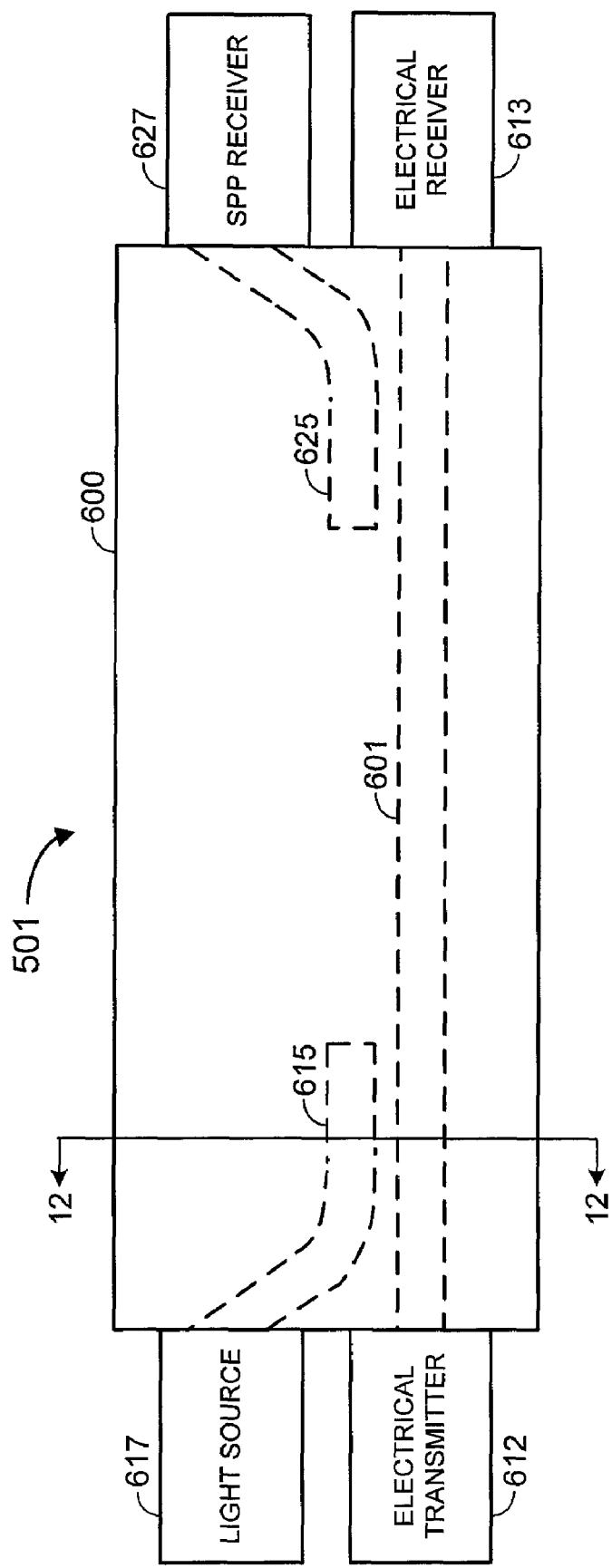
FIG. 11 depicts an exemplary embodiment of a system for communicating information via a surface plasmon-polariton wave and an electrical current in accordance with the present disclosure.
Figure 12:
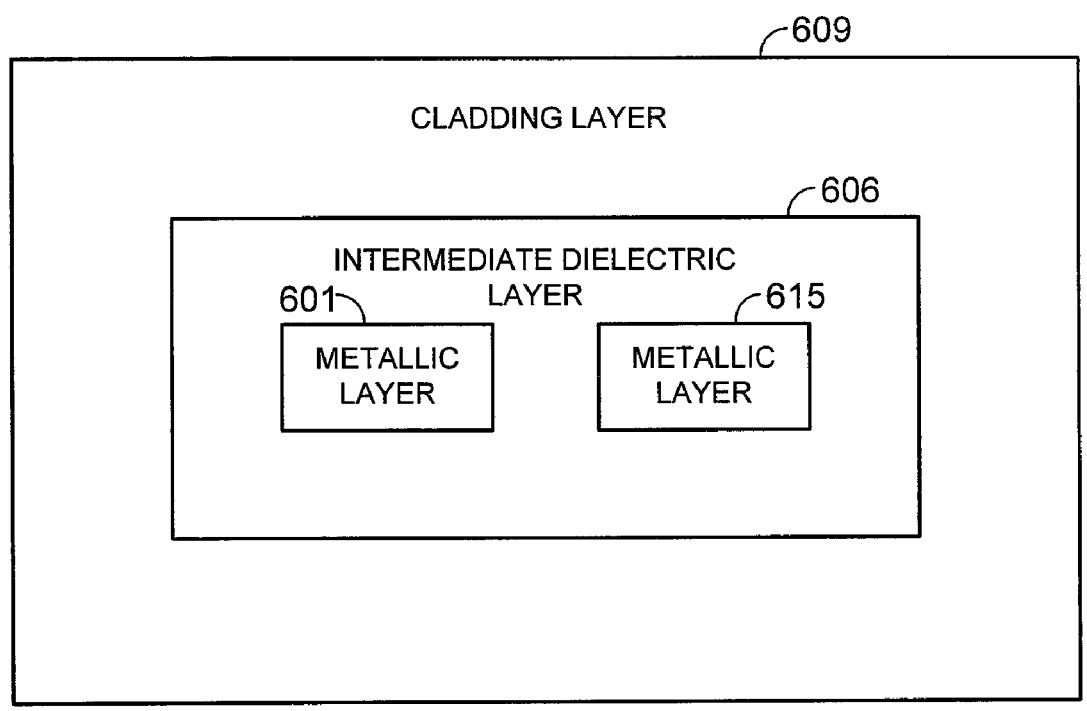
FIG. 12 depicts a cross-sectional view of the waveguide depicted in FIG. 11.

FIG. 11 depicts an exemplary embodiment of a communication system 501 for communicating information via a surface plasmon-polariton wave and transmitting electrical current. In the exemplary embodiment shown by FIG. 11, the system 501 comprises a waveguide 600 similar to any of the embodiments described herein. In this regard, the waveguide 600 comprises a metallic layer 601 having at least one surface contacting intermediate dielectric material that is sandwiched between the metallic layer 601 and cladding material. For example, FIG. 12 depicts a cross-sectional view of the exemplary embodiment shown in FIG. 11. In this regard, an intermediate dielectric layer 606 surrounds the metallic layer 601, and the intermediate dielectric layer 606 is surrounded by a cladding layer 609. Similar to the embodiments described above, the metallic layer 601 is composed of a material having a dielectric constant with a negative real part. Further, the intermediate dielectric layer 606 is composed of a dielectric material having a dielectric constant with a positive real part, and the cladding layer 609 is composed of a dielectric material having a dielectric constant with a positive real part that is higher than the real part of the dielectric constant for the intermediate dielectric layer 606.

One end of the metallic layer 601 of the waveguide 600 is connected to an electrical transmitter 612, and the other end is connected to an electrical receiver 613. The electrical transmitter 612 is configured to transmit electrical current that is received by the electrical receiver 613. For example, the electrical transmitter 612 may transmit a power signal and/or a data signal via the metallic layer 601 to the electrical receiver 613.

Another metallic layer 615 is positioned to receive an excitation signal from a light source 617, such as a laser. The metallic layer 615, like the layer 601 is surrounded by the intermediate dielectric layer 606 and is composed of a material having a dielectric constant with a negative real part. The excitation signal from the light source 617 induces a surface plasmon-polariton wave that propagates along the metallic layer 615. In one exemplary embodiment, the light source 617 modulates the excitation signal with data so that the SSP wave induced by the excitation signal carries such data for reception by a SPP receiver 627.

The metallic layer 615 is positioned close to the metallic layer 601 such that electromagnetic energy of the SSP wave propagating along the metallic layer 615 induces surface plasmons in the metallic layer 601. The surface plasmons generate electromagnetic energy, and a SSP wave begins propagating along the metallic layer 601. In this way, the propagation of the SSP wave switches from the metallic layer 615 to the metallic layer 601 without the layers 601, 615 actually intersecting. Since the layers 601, 615 do not intersect, there is no junction between the layers 601, 615 that may cause an undesirable reflection.

Moreover, while the SSP wave is propagating along the metallic layer 601, electrical current may be simultaneously transmitted via the metallic layer 601 by the transmitter 612 to the receiver 613.

As shown by FIG. 11, another metallic layer 625 extends from a SPP receiver 627. The metallic layer 625, which is also surrounded by the intermediate layer 606 and cladding layer 609, is positioned in close proximity to the metallic layer 601 such that electromagnetic energy from the SSP wave propagating along the layer 601 induces surface plasmons in the metallic layer 625. Thus, the SSP wave propagating along the metallic layer 601 transitions to the metallic layer 625, and the SPP receiver 627 detects the SSP wave propagating along the metallic layer 625. Accordingly, a SSP wave induced by an excitation signal from the light source 617 is transmitted along the metallic layers 601, 615, 625 to the SPP receiver 627. At the same time, electrical current can be transmitted from the transmitter 612 to the receiver 613 via metallic layer 601.

Note that a surface plasmon-polariton wave receiver 627 is any device that is configured to detect a surface plasmon-polariton wave and recover data from the surface plasmon-polariton wave. In the above example, the SPP receiver 627 is configured to recover the data used to modulate the excitation signal by the light source 617. An exemplary surface plasmon-polariton wave receiver 627 is depicted in FIG. 13.

Figure 13:
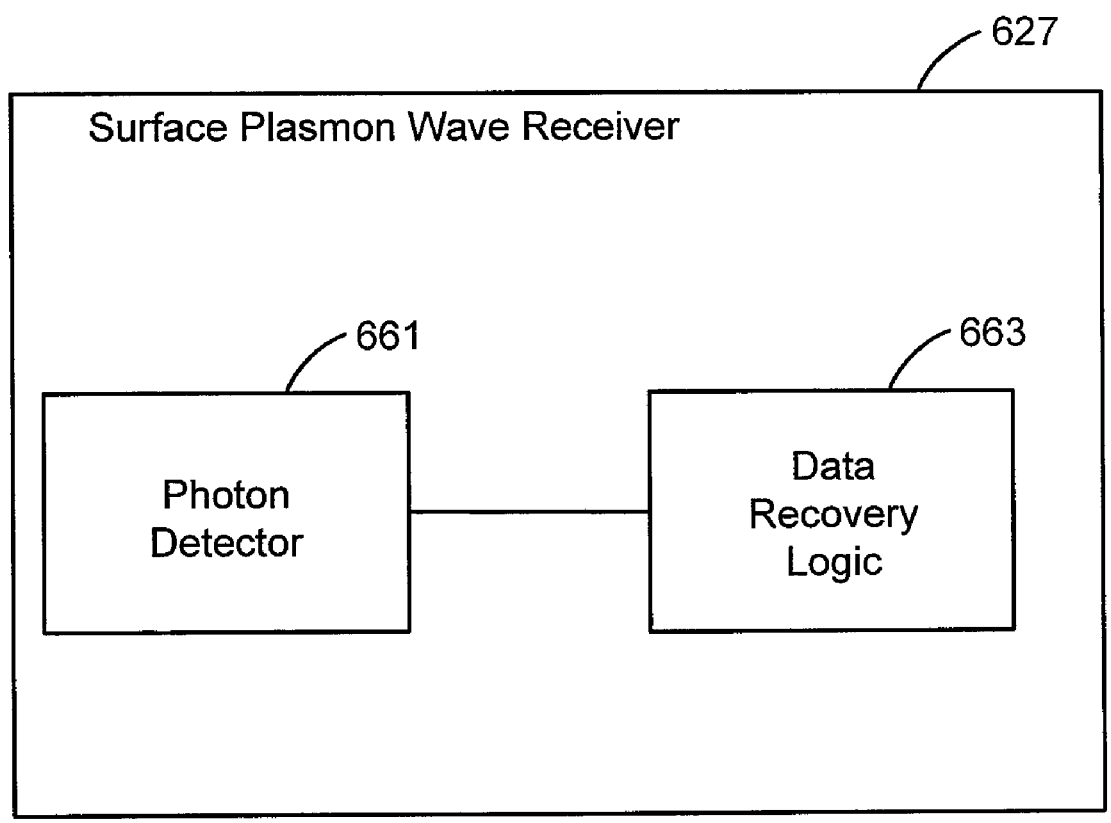
FIG. 13 depicts an exemplary embodiment of a surface plasmon-polariton wave receiver, such as is depicted in FIG. 11.

The exemplary surface plasmon-polariton wave receiver 627 shown in FIG. 13 comprises a photon detector 661 that is configured to detect an intensity of the electromagnetic energy of the surface plasmon-polariton wave. Data recovery logic 663 receives the intensity values measured by the photon detector 661 and analyzes the intensity values over time to recover the originally transmitted data (i.e., the data used to modulate the excitation signal transmitted by the light source 617). The data recovery logic 663 may be implemented in hardware, software, or a combination thereof. When implemented in software, the data recovery logic 663 may be stored on any computer-readable medium, and at least one processing element (not shown), such as a central processing unit (CPU) or digital signal processor (DSP), may be used to execute the software defining the data recovery logic 663.

In at least one embodiment, the electrical transmitter 612 is configured to transmit an electrical data signal over the metallic layer 601, and the surface plasmon-polariton wave propagating along the metallic layer 601 is at a higher frequency than the data signal. Thus, the surface plasmon-polariton wave does not significantly interfere with the data signal even though the data signal and surface plasmon-polariton wave may simultaneously propagate along the metallic layer 601. For example, the surface plasmon-polariton wave has an optical wave frequency, and the data signal may be from microwave to the DC range. Various other frequency ranges are possible.

Figure 14:
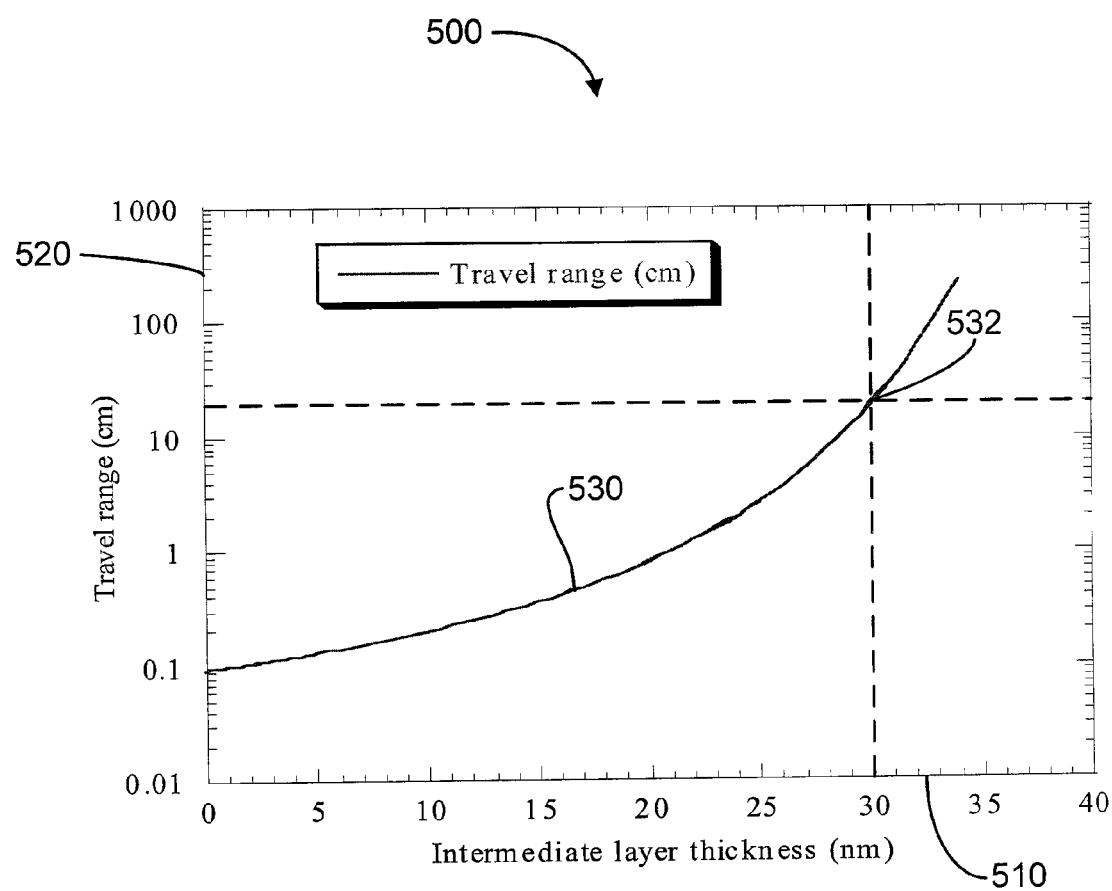
FIG. 14 depicts an exemplary performance of a SPP waveguide, such as is depicted in FIG. 5, in accordance with the present disclosure.

Numerical analysis techniques applied to a waveguide 100, such as is depicted in FIG. 5, show exemplary propagation ranges, graph 500, as depicted in FIG. 14. A performance curve 530, as depicted on graph 500 shows that the propagation range varies as the thickness, t1, of the intermediate layer 122 is varied. The propagation range is shown on the vertical axis, labeled travel range, and has values from around 0.1 cm to around 100 cm.

For propagation graph 500, a waveguide 100, such as is depicted in FIG. 5, was tested. For such waveguide 100, the metallic layer 110 is a gold strip of about 1 micron wide and has a thickness of about 20 nm. The dielectric constant for the intermediate layer is $(1.45)^2$ and the dielectric constant for the cladding layer is $(1.6)^2$. For a selected wavelength of 850 nm, gold has a permittivity of $-28.281-1.577j$. When the intermediate layer 122 has a thickness of about 30 nm, then the travel range (propagation range) is around 20 cm. The travel range and intermediate layer thickness of about 30 nm intersect performance curve 530 at location 532.

Figure 15:
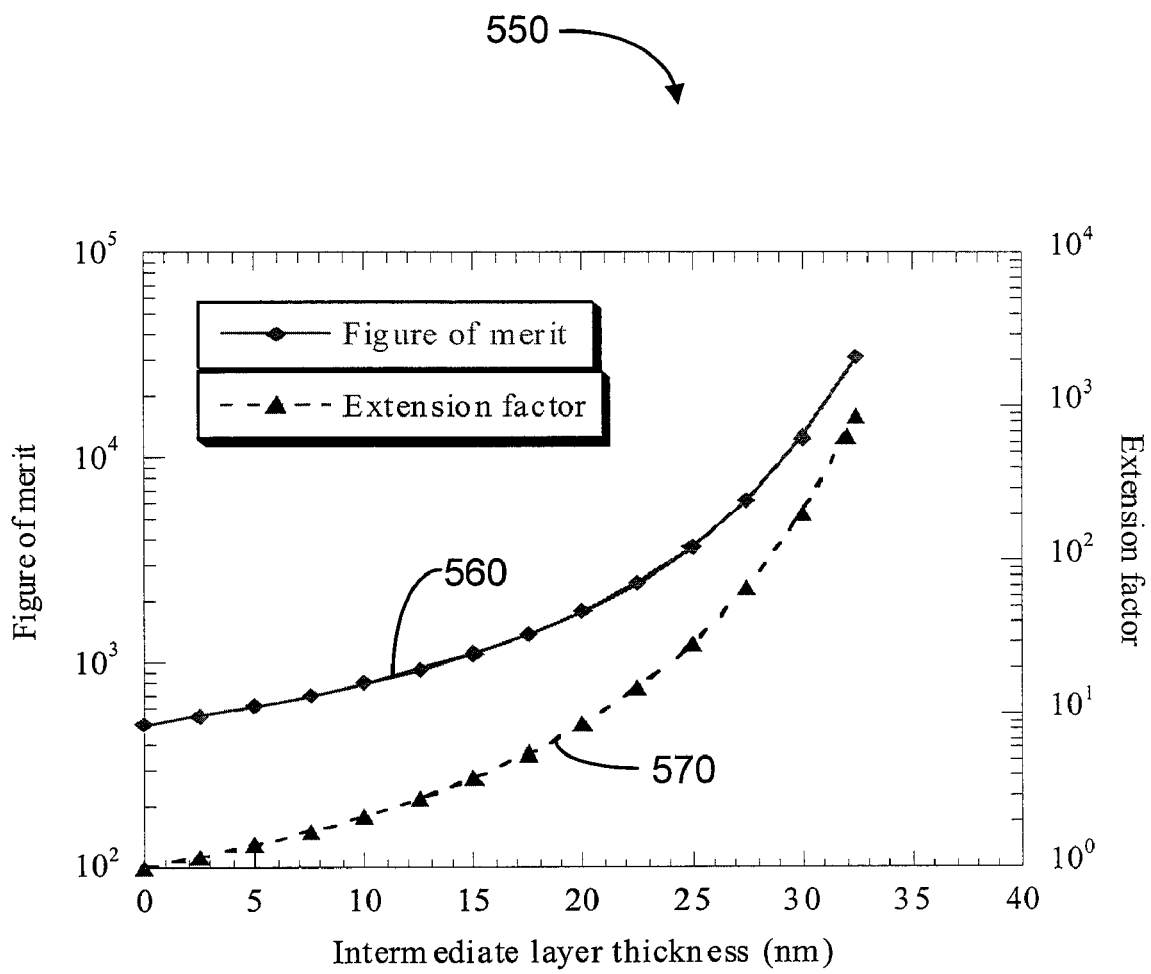
FIG. 15 depicts an exemplary performance of an exemplary embodiment of a waveguide, such as is depicted in FIG. 5, in accordance with the present disclosure.

Another representation of waveguide performance is depicted in a merit chart 550 shown in FIG. 15. A figure of merit curve 560 and an extension factor curve 570 show the improvements provided by waveguide 100, such as the one shown by FIG. 3 and FIG. 5. The figure of merit is defined as the ratio of the propagation distance to the mode size as understood by those in the art. The extension factor is the ratio of travel ranges of the SPP waveguides with intermediate layers over the SPP travel range without intermediate layers.

The performance curves of FIG. 14 and FIG. 15 demonstrate that embodiments of the present disclosure drastically extend the travel range of surface plasmon-polariton waves that support the polariton mode. Additionally, FIG. 11 shows an exemplary waveguide with a metallic strip transporting a SSP wave as well as electrical current between electrical circuits connected to the metallic strip.

It should be further emphasized that the above-described embodiments of the present disclosure are examples of implementations, merely set forth for a clear understanding of the principles of the disclosure. Many variations and modifications may be made to the above-described embodiments of the disclosure without departing substantially from the spirit and principles of the disclosure. For example, the SPP waveguide structure can be asymmetric with respect to the center of the metal layer. As long as the intermediate dielectric layer next to the metal layer (film) has a lower dielectric constant than that of the cladding dielectric, the attenuation of the SPP wave can be reduced, and the travel range of SPP wave can be extended. Also, the intermediate dielectric layers can be reduced from both sides to just one side. All such modifications and variations are intended to be included herein within the scope of this disclosure protected by the following claims.

Now, therefore, the following is claimed:

1. A waveguide for propagation of a surface plasmon-polariton wave, comprising:
   a first layer composed of a material having a dielectric constant with a negative real part;
   a second layer composed of a dielectric material having a dielectric constant; and
   a third layer composed of a dielectric material having a dielectric constant that is greater than the dielectric constant of the second layer, wherein the second layer is between the first layer and the third layer.

2. The waveguide of claim 1, wherein the material of the first layer is metallic.

3. The waveguide of claim 1, wherein the first layer has a thickness that is sufficiently small such that a surface plasmon-polariton wave propagating along a surface of the first layer couples with a surface plasmon-polariton wave propagating along another surface of the first layer.

4. The waveguide of claim 1, wherein the first layer is coupled to a transmitter that is configured to transmit electrical current via the first layer.

5. The waveguide of claim 1, wherein the first layer is coupled to a surface plasmon-polariton wave receiver.

6. The waveguide of claim 5, wherein the first layer is coupled to an electrical transmitter.

7. A communication system, comprising:
   a waveguide having intermediate dielectric material disposed between metallic material and cladding material, the intermediate dielectric material having a dielectric constant that is lower than a dielectric constant of the cladding material; and
   a surface plasmon-polariton wave receiver coupled to the waveguide.

8. The system of claim 7, wherein the cladding material surrounds the intermediate dielectric material and the metallic material.

9. The system of claim 7, wherein the intermediate dielectric material surrounds the metallic material.

10. The system of claim 7, wherein the intermediate dielectric material is symmetrical about the metallic material.

11. The system of claim 7, further comprising an electrical transmitter configured to transmit electrical current via the metallic material.

12. The system of claim 7, wherein the surface plasmon-polariton wave receiver comprises a photon detector.

13. A communication system, comprising:
   a waveguide having a first material for supporting surface plasmons, the waveguide further having intermediate dielectric material and cladding material, the intermediate dielectric material disposed between the first material and the cladding material and having a dielectric constant less than a dielectric constant of the cladding material;
   an optical transmitter configured to modulate an optical signal with data and to transmit the modulated optical signal such that the modulated optical signal generates a first surface plasmon-polariton wave that propagates through the waveguide; and
   a surface plasmon-polariton wave receiver configured to detect the surface plasmon-polariton wave and recover the data.

14. The system of claim 13, further comprising:
   an electrical transmitter configured to transmit electrical current via the first material; and
   an electrical receiver configured to receive the electrical current.

15. The system of claim 13, wherein the first material is metallic.

16. A method for communicating information via surface plasmon-polariton waves, comprising the step of:
   transmitting an excitation signal toward a first material of a waveguide thereby generating surface plasmons in the first material, the waveguide having cladding material and intermediate dielectric material disposed between the cladding material and the first material, wherein the intermediate dielectric material has a dielectric constant below a dielectric constant of the cladding material; and
   receiving a surface plasmon-polariton wave based on the surface plasmons; and
   recovering information from the received surface plasmon-polariton wave.

17. The method of claim 16, wherein the first material is metallic.

18. The method of claim 16, further comprising the step of transmitting electrical current across the first material while the surface plasmon-polariton wave is propagating a song the first material.

\* \* \* \* \*